US009246743B2

(12) United States Patent
Gai et al.

(10) Patent No.: US 9,246,743 B2
(45) Date of Patent: *Jan. 26, 2016

(54) END-TO END FIBRE CHANNEL OVER ETHERNET

(71) Applicant: Cisco Technology, Inc., San Jose, CA (US)

(72) Inventors: Silvano Gai, Groveland, CA (US); Claudio Desanti, Oakland, CA (US); Marco Di Benedetto, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/965,610

(22) Filed: Aug. 13, 2013

(65) Prior Publication Data
US 2013/0329743 A1 Dec. 12, 2013

Related U.S. Application Data

(63) Continuation of application No. 12/822,551, filed on Jun. 24, 2010, now Pat. No. 8,514,856.

(51) Int. Cl.
*H04L 29/08* (2006.01)
*H04L 12/46* (2006.01)
*H04L 12/931* (2013.01)

(52) U.S. Cl.
CPC ........ *H04L 29/08702* (2013.01); *H04L 12/462* (2013.01); *H04L 49/351* (2013.01); *H04L 49/357* (2013.01); *H04L 49/602* (2013.01)

(58) Field of Classification Search
CPC ............................... H04L 29/08; H04L 12/56
USPC ......................................................... 370/392
See application file for complete search history.

(56) References Cited

U.S. PATENT DOCUMENTS

| 6,400,730 B1 | 6/2002 | Latif et al. |
| 6,895,461 B1 | 5/2005 | Thompson |

(Continued)

FOREIGN PATENT DOCUMENTS

| WO | WO 2009/085536 | * | 7/2009 |
| WO | WO-2009/085536 A2 | | 7/2009 |

OTHER PUBLICATIONS

John L. Hufferd, Proxy Based Shortcut, Oct. 7, 2009, Hufferd enterprises, all pages.*

(Continued)

*Primary Examiner* — Dang Ton
*Assistant Examiner* — Mewale Ambaye
(74) *Attorney, Agent, or Firm* — Novak Druce Connolly Bove + Quigg LLP (57) ABSTRACT

In one embodiment, a Fibre Channel over Ethernet (FCoE) proxy point (FPP) that is connected to one or more end-point devices is coupled to one or more other FPPs, and to a FCoE control and management plane (F-CMP) server. The FPP provides data plane functionality. The F-CMP server provides control plane functionality. At least some control and management traffic received at the FPP is proxied between the F-CMP server and the one or more end point devices connected to the FPP. FCoE traffic received at the FPP from the one or more end point devices connected to the FPP is transmitted to the one or more other FPPs without the FCoE traffic traversing the F-CMP server. The transmitting is performed by data plane functionality of the FPP operating under directions from the control plane functionality of the F-CMP server.

20 Claims, 7 Drawing Sheets

(56) References Cited

U.S. PATENT DOCUMENTS

| | | | |
|---|---|---|---|
| 7,200,610 | B1 | 4/2007 | Prawdiuk et al. |
| 7,293,105 | B2 | 11/2007 | Benedetto et al. |
| 7,333,612 | B2 | 2/2008 | Maino et al. |
| 7,346,058 | B1 | 3/2008 | Natarajan et al. |
| 7,353,260 | B1 | 4/2008 | Senum |
| 7,433,948 | B2 | 10/2008 | Edsall et al. |
| 7,433,952 | B1 | 10/2008 | Woodruff |
| 7,460,527 | B2 | 12/2008 | Ghosh et al. |
| 7,499,410 | B2 | 3/2009 | Dutt et al. |
| 7,564,869 | B2 | 7/2009 | Cafiero et al. |
| 7,593,324 | B2 | 9/2009 | Jain et al. |
| 7,599,360 | B2 | 10/2009 | Edsall et al. |
| 7,602,720 | B2 | 10/2009 | Bergamasco et al. |
| 7,624,184 | B1 | 11/2009 | Aviani et al. |
| 7,630,405 | B1 | 12/2009 | Gao et al. |
| 7,649,844 | B2 | 1/2010 | Bector et al. |
| 7,706,294 | B2 | 4/2010 | Natarajan et al. |
| 7,716,350 | B2 | 5/2010 | Howarth et al. |
| 7,738,493 | B2 | 6/2010 | Golshan et al. |
| 2006/0023707 | A1 | 2/2006 | Makishima et al. |
| 2006/0087989 | A1 | 4/2006 | Gai et al. |
| 2006/0098589 | A1 | 5/2006 | Kreeger et al. |
| 2006/0098681 | A1 | 5/2006 | Cafiero et al. |
| 2006/0101140 | A1 | 5/2006 | Gai et al. |
| 2006/0171318 | A1 | 8/2006 | Bergamasco et al. |
| 2006/0251067 | A1 | 11/2006 | DeSanti |
| 2007/0071011 | A1 | 3/2007 | de Heer et al. |
| 2007/0081454 | A1 | 4/2007 | Bergamasco et al. |
| 2007/0112931 | A1 | 5/2007 | Kuik et al. |
| 2008/0235508 | A1* | 9/2008 | Ran et al. ............... 713/151 |
| 2009/0010162 | A1 | 1/2009 | Bergamasco et al. |
| 2009/0019142 | A1 | 1/2009 | Dutt et al. |
| 2009/0037977 | A1* | 2/2009 | Gai et al. ................ 726/1 |
| 2009/0052326 | A1 | 2/2009 | Bergamasco et al. |
| 2009/0141657 | A1 | 6/2009 | Dutt et al. |
| 2011/0051733 | A1 | 3/2011 | Hirata |
| 2012/0054850 | A1* | 3/2012 | Bhardwaj et al. ........ 726/12 |

OTHER PUBLICATIONS

Gai, Silvano, et al., "Fibre Channel Over Ethernet", I/O Consolidation in the Data Center, Chapter 3, Cisco Press, Sep. 2009, pp. 67-123.

Hufferd, John L. "Proxy Based Shortcut," Hufferd Enterprises, Oct. 7, 2009, pp. 1-21.

* cited by examiner

END-TO END FIBRE CHANNEL OVER ETHERNET

RELATED APPLICATION

The present application is a continuation of U.S. patent application Ser. No. 12/822,551 filed on Jun. 24, 2010 by Silvano Gai et al., entitled "End-to-End Fibre Channel Over Ethernet", the contents of which are incorporated by reference in their entirety.

TECHNICAL FIELD

The present disclosure relates generally to computer networks, and, more particularly, to Fibre Channel over Ethernet (FCoE).

BACKGROUND

Fibre Channel is the preeminent technology used for storage networking, as it can provide native support for SCSI (small computer system interface) operations and large data transfers, and also defines a lossless fabric as its transmission medium. Fibre Channel over Ethernet (FCoE), as generally defined by the INCITS T11 FC-BB-5 standard, allows Fibre Channel frames to be carried inside Ethernet frames. In this manner, SCSI can be mapped into native Fibre Channel frames, which can then be encapsulated in Ethernet frames over an Ethernet network, enhanced with certain provisions in order to ensure the same lossless characteristics of a Fibre Channel fabric.

Currently, FCoE is implemented using what are referred to as FCoE "cones," where in order for FCoE devices (initiators and targets) to communicate with each other over the Ethernet network, the FCoE frames must traverse an intermediate Fibre Channel switching function or FCoE Forwarder (FCF). In particular, the FCFs contain the control plane, management plane, and data plane responsible for providing FCoE functionality among FCoE devices. Accordingly, there are currently no "short cuts" allowed between FCoE devices over an Ethernet network that bypass the FCF. For this reason in certain configurations the FCFs may become a poorly scalable bottleneck in the FCoE architecture.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, one or more Fibre Channel over Ethernet (FCoE) proxy points (FPPs) communicates control and management information with a separately housed FCoE control and management plane (F-CMP) server in order to direct data plane functionality of the FPPs. Each FPP also proxies control and management protocols between the F-CMP server and one or more FCoE end-point devices for which the FPP is responsible. Traffic received by the FPP may then be processed according to the directed data plane functionality, such that FCoE traffic transmitted between first and second FCoE end-point devices separated by the Ethernet network is directed over the Ethernet network end-to-end between correspondingly responsible FPPs without traversing the F-CMP server.

Description

A computer network typically comprises a plurality of interconnected entities. An entity may consist of any network device, such as a server or end station, that "sources" (i.e., transmits or provides) or "sinks" (i.e., receives or obtains) data frames. A common type of computer network is a local area network ("LAN"), which typically refers to a privately owned network within a single building or campus. LANs typically employ a data communication protocol (LAN standard), such as Ethernet, FDDI, or token ring, that defines the functions performed by the data link and physical layers of a communications architecture (i.e., a protocol stack).

One or more intermediate network devices are often used to couple LANs together and allow the corresponding entities to exchange information. For example, a bridge (or switch) may be used to provide a "bridging" (or "switching") function between two or more LANs. Typically, the bridge is a computer and includes a plurality of ports that are coupled to the LANs. Ports that are coupled to LANs that are, in turn, coupled to other bridges are generally referred to as a trunk ports, whereas ports used to couple bridges through LANs to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may reassemble or convert received data frames from one LAN standard (e.g., Ethernet) to another (e.g. token ring). Thus, Layer-3 devices are often used to interconnect dissimilar subnetworks.

As noted above, Fibre Channel is the preeminent technology used for storage networking for various reasons as may be appreciated by those skilled in the art. For instance, Fibre Channel is generally considered a lossless transmission protocol. Fibre Channel over Ethernet (FCoE) is a protocol that extends Fibre Channel by allowing Fibre Channel frames to be carried inside Ethernet frames. In this manner, SCSI (small computer system interface) traffic may be mapped into native Fibre Channel frames for further encapsulation into an Ethernet frame over an Ethernet network.

FCoE is currently implemented using what are referred to as FCoE "cones," where in order for FCoE end devices (initiators and targets) to communicate with each other over the Ethernet network, the devices must traverse an intermediate Fibre Channel switch or FCoE forwarder (FCF) (i.e., there are no "short cuts" across the Ethernet network that bypass the FCF). Illustrative examples of "cones" may comprise regions of an Ethernet network composed of FIP (FCoE Initialization Protocol) snooping bridges, devices that implement a VNLINK/VNTag architecture, or IEEE 802.1Qbh Port Extenders, as may be appreciated by those skilled in the art.

FCFs, in particular, contain the control plane, management plane, and data plane responsible for providing FCoE functionality between FCoE devices. For instance, the FCFs are responsible for maintaining control and management protocols with the FCoE devices (e.g., discovery, keepalives, etc.), as well as data plane controls used for proper forwarding traffic over the Ethernet network. For example, the data plane controls may comprise enforcing Fibre Channel zoning and FCoE access control lists (ACLs), and maintaining media access control (MAC) address mappings for Ethernet transmission between the devices. Additionally, since the control plane, management plane, and data plane are all present in the hardware of a conventional FCF, new hardware introduced to the network require the introduction of all three planes, accordingly.

According to embodiments of the disclosure, then, an end-to-end FCoE solution is provided where FCoE (or native Fibre Channel) traffic may enter the Ethernet network at one FCoE device and traverse the Ethernet network to another FCoE device without first being directed through an FCF. In particular, the embodiments herein decouple the control and management planes from the data plane of the FCF, splitting the FCF into an FCoE control and management plane (F-CMP) server and a plurality of FCoE proxy points (FPPs), described in detail herein. That is, the core functionality of the FCF or FCoE switch is divided into an F-CMP server providing the control plane functionality and a plurality of FPPs providing the data plane functionality at the periphery of the Ethernet network. In this manner, the FPPs may directly communicate FCoE traffic between each other (for their locally attached FCoE devices) as described below, without redirection to a centralized FCF as in the "cone" arrangement mentioned above (or, notably, to an F-CMP server).

Figure 1:
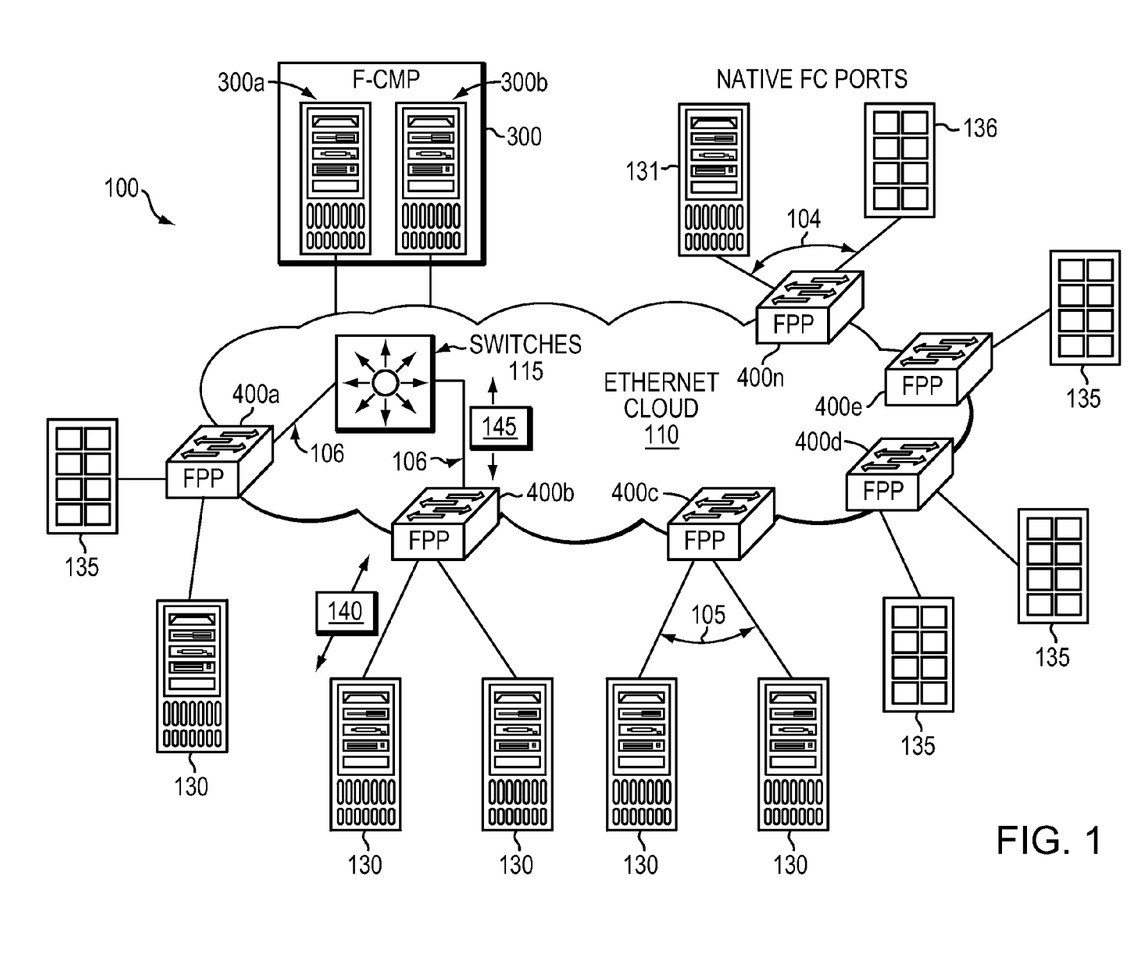
FIG. 1 illustrates an example computer network.

FIG. 1 is a schematic block diagram of an example computer network 100 illustratively comprising nodes/devices, such as one or more FCoE devices 130/135, interconnected via Ethernet links 105 to an Ethernet cloud/network 110 via correspondingly responsible FPPs 400 (e.g., a, b, . . . n) as described herein. For instance, FCoE devices or endpoints may comprise various initiators 130 (e.g., FCoE computers) and targets 135 (e.g., FCoE storage subsystems). Within the Ethernet network 110 there may be one or more Ethernet switches (bridges) 115 interconnected by Ethernet links 106, forming the fabric through which the FPPs may reach one another across the cloud 110. FPPs may also enable native Fibre Channel devices 131/136 to access the Ethernet cloud 110 through native Fibre Channel ports 104. Also, as described herein, one or more F-CMP servers 300 (e.g., a and b, redundant servers) may be attached to the Ethernet network 110 and in communication with the one or more FPPs 400. Traffic (data packets/frames) may be exchanged among the nodes/devices of the computer network 100 using either pre-defined Fibre Channel, FCoE, or FIP (FCoE Initialization Protocol) communication protocols for FCoE messages 140 or Ethernet network communication protocols for Ethernet messages 145 (e.g., data center bridging or "DCB" Ethernet). Note that the Ethernet messages 145 encapsulating Fibre Channel traffic as FCoE traffic, may comprise certain provisions to ensure Fibre Channel's lossless characteristics. Those skilled in the art will understand that any number of nodes, devices, links, etc. may be used in the computer network, and that the view shown herein is for simplicity. The computer network 100 of FIG. 1 is meant for illustration purposes only and is not meant to limit the embodiments described herein.

Figure 2:
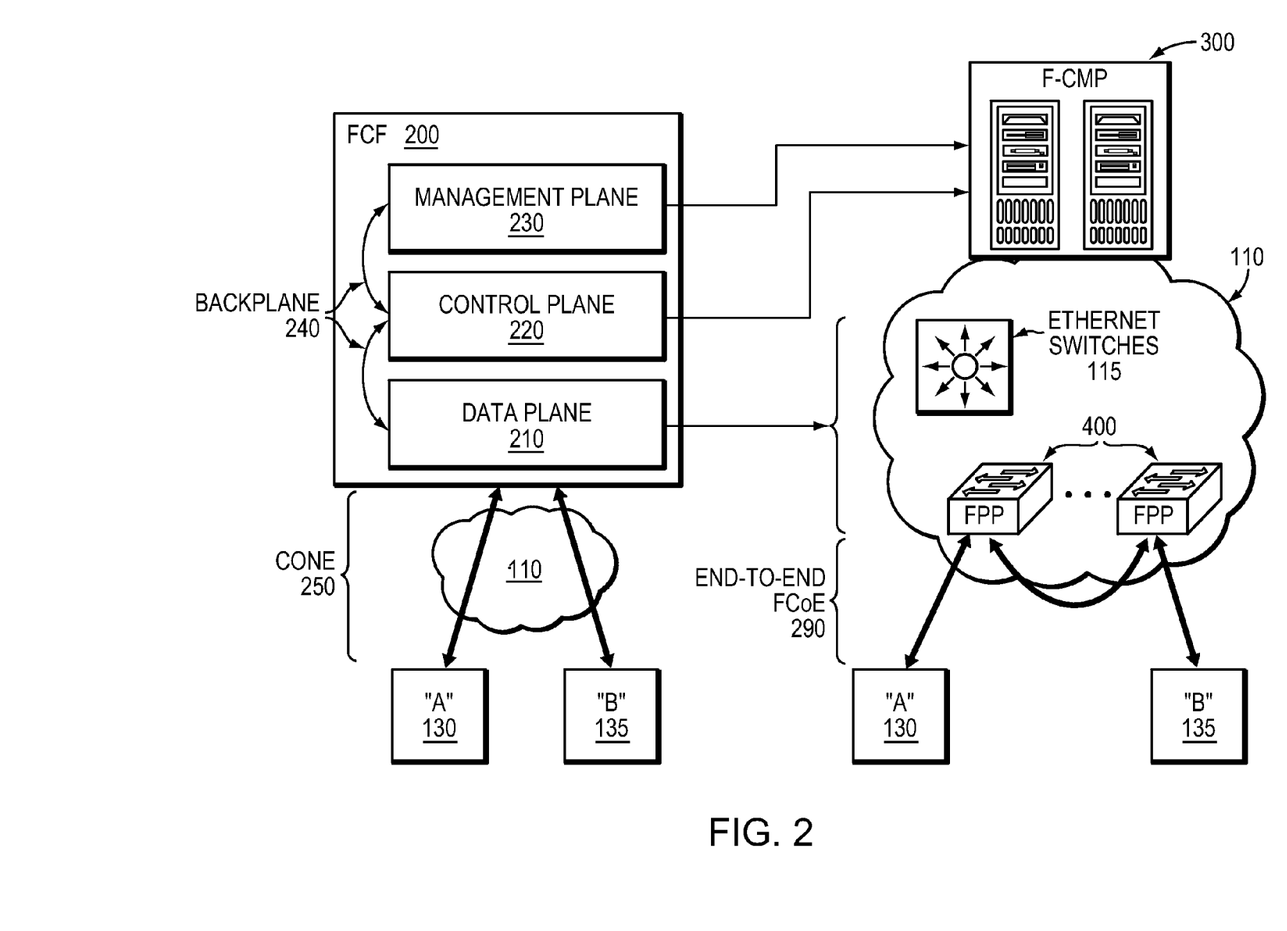
FIG. 2 illustrates an example arrangement of management, control, and data planes.

FIG. 2 illustrates a schematic block diagram of the transitioned FCoE forwarder (FCF) 200 in accordance with one or more embodiments herein. In particular, a conventional FCF 200 generally comprises a data plane 210 (or forwarding plane), a control plane 220, and a management plane 230, as may be appreciated by those skilled in the art. For instance, the data plane 210 comprises the circuitry and programming to forward traffic on physical or virtual interfaces according to a set of forwarding rules/policies. Generally, these rules and policies are dictated by the control plane 220, which may consist of one or more protocol engines configured to make forwarding decisions, e.g., based on network topologies. As an example, assuming that initiator 130 "A" desires to send FCoE traffic over the Ethernet cloud 110 to target 135 "B", the FCF 200 must be traversed, resulting in a "cone" 250. The FCF thus controls the forwarding of the Ethernet traffic from the initiator to the target. The management plane 230 generally comprises processes responsible for managing operations on the device, such as applications that monitor statistics, connectivity, front-end (user) interfaces, etc. The data plane, control plane, and management plane of the conventional FCF are interconnected by a "backplane" 240, such as internal circuitry (buses, interfaces, etc.), providing communication between the planes, accordingly.

According to the techniques herein, the functionality of the conventional FCF 200 is split into the two separately housed devices, that is, the illustratively named FCoE control and management plane (F-CMP) server 300 and a plurality of FCoE proxy points (FPPs) 400, as described herein. As shown in FIG. 2, the FPPs 400 provide the functionality of the data plane 210 and the F-CMP server 300 provides the functionality of the control and management planes 220/230 (alternatively referred to as a supervisor), while the backplane 240 is replaced by the Ethernet network 110 (and switches 115) interconnecting the FPPs 400 and F-CMP server 300. The periphery of FPPs 300 surrounding the Ethernet cloud 110 and F-CMP server 400 thus acts as an FCF, where the FCoE end points (initiators 130 and targets 135) continue to operate in their conventional manner (e.g., according to the FC-BB-5 standard). Notably, this accordingly requires no substantial change to the operation of FCoE devices (initiators and targets), one main value of FCoE, which prefers compatibility with previous Fibre Channel devices and protocols.

In this manner, the intelligence of a Fibre Channel switching fabric is still provided to FCoE devices, but due to the decoupling of responsibilities, the FCoE solution scales well. Specifically, an end-to-end FCoE solution is provided that removes the requirement of FCoE traffic traversing the FCF (FCoE cones), or in this case, the F-CMP 300, where as mentioned below, zoning may be enforced by the perimeter FPPs. Scalability is further enhanced since there is not an overabundance of management points in the network, simply relying on a single (or redundant, described below) F-CMP server to control the data planes of the perimeter of FPPs.

Figure 3:
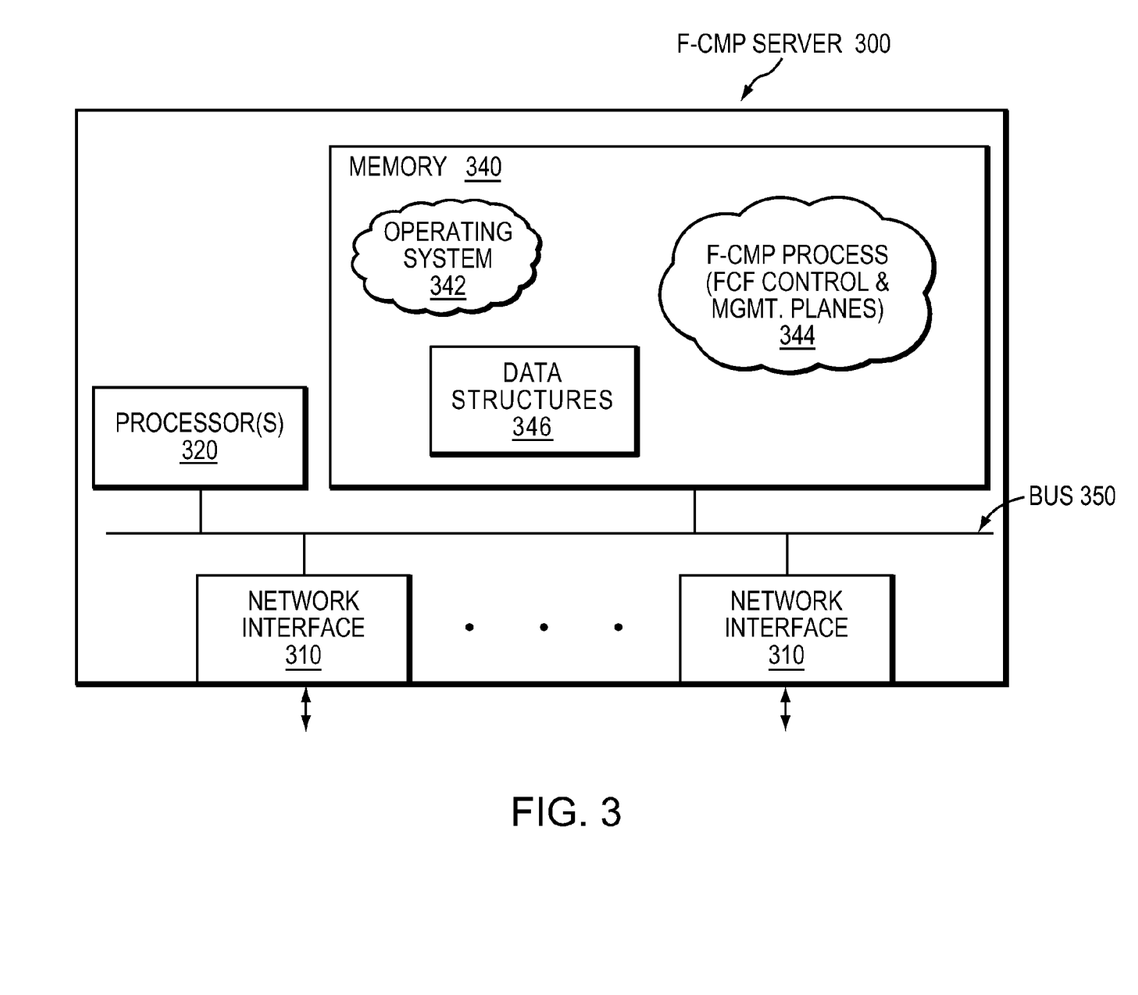
FIG. 3 illustrates an example Fibre Channel over Ethernet (FCoE) control and management plane (F-CMP) server.

FIG. 3 is a schematic block diagram of an example F-CMP server 300 that may be used with one or more embodiments described herein. (Alternatively, F-CMP server may be referred to as an FC-CMP for "Fibre Channel Control and Management Plane.") The server comprises a plurality of network interfaces or ports 310, one or more processors 320, and a memory 340 interconnected by a system bus 350. The network interfaces/ports 310 contain the mechanical, electrical, and signaling circuitry for communicating data over physical links coupled to the network 100. The network interfaces/ports may be configured to transmit and/or receive data (frames) using a variety of different communication protocols over physical links or wireless links, such as links 106 for Ethernet communication (e.g., IEEE Std. 802.3). In certain situations, the F-CMP server 300 may comprise one or more interfaces capable of communicating Fibre Channel messages.

The memory 340 comprises a plurality of storage locations that are addressable by the processor(s) 320 and the network interfaces/ports 310 for storing software programs and data structures associated with the embodiments described herein. The processor(s) 320 may comprise necessary elements or logic adapted to execute the software programs and manipulate the data structures 346. An operating system 342 (e.g., the Nexus® Operating System, or NX-OS, of Cisco Systems, Inc., as well as the Internetworking Operating System, or IOS®, also of Cisco Systems, Inc.), portions of which are typically resident in memory 340 and executed by the processor(s), functionally organizes the node by, inter alia, invoking network operations in support of software processes and/or services executing on the server. It will be apparent to those skilled in the art that other types of processors and memory, including various computer-readable media, may be used to store and execute program instructions pertaining to the techniques described herein.

Portions of the F-CMP server 300 may be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art. For example, certain processes and/or services as used herein may comprise an illustrative "F-CMP" process 344, which may contain computer executable instructions executed by the processor(s) 320 to perform various functions relating to the F-CMP server techniques as described herein. In particular, F-CMP process 344 may act as the management and control planes of the FCF in a manner as described below in conjunction with the FPPs. Notably, an F-CMP server may be based on hardware of an FCF, though programmed to operate as an F-CMP as described herein, thus operating as the control and management planes for separate FPPs in the network. Note also that an F-CMP server may also contain an FPP.

Figure 4:
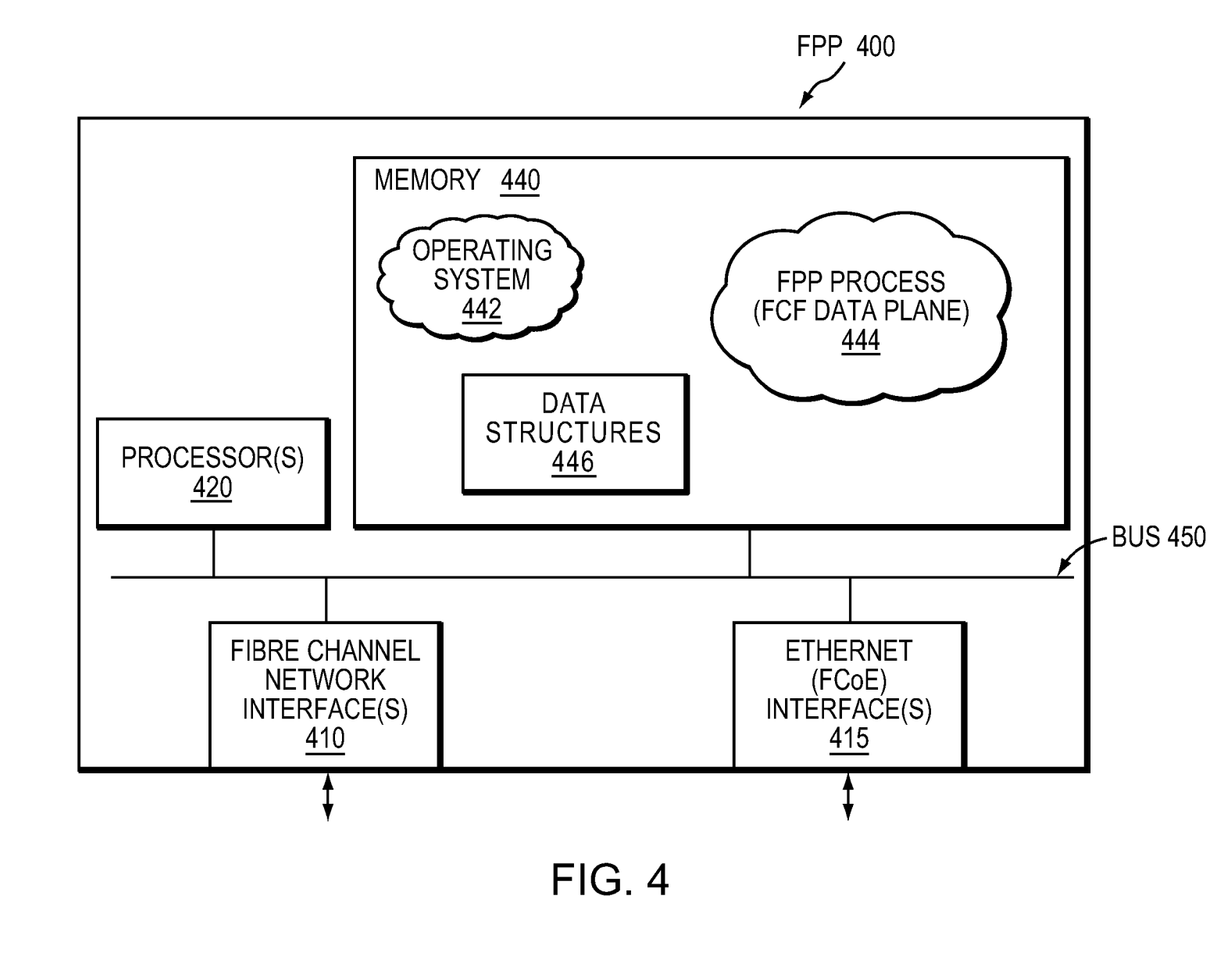
FIG. 4 illustrates an example FCoE proxy point (FPP)

FIG. 4 is a schematic block diagram of an example FPP 400 that may be used with one or more embodiments described herein. The FPP device comprises a plurality of network interfaces or ports, such as Ethernet ports 415 (or FCoE ports 415) and Fibre Channel ports 410, one or more processors 420, and a memory 440 interconnected by a system bus 450. The network interfaces/ports contain the mechanical, electrical, and signaling circuitry for communicating data over physical links coupled to the network 100, particular, for respective protocols (e.g., Ethernet or Fibre Channel). Specifically, the Fibre Channel ports 410 and FCoE ports 415 are interconnected within the FPP 400, and operate according to the data plane functionality, as described herein. Notably, a network interface/port may also be used to implement one or more virtual network interfaces, such as for Virtual LANs (VLANs), as will be understood by those skilled in the art. Illustratively, the handling of frames within the network interfaces/ports 410/415 may conform to a protocol stack (not shown) that defines the functions performed by the data link and physical layers of a communications architecture.

The memory 440 comprises a plurality of storage locations that are addressable by the processor(s) 420 and the network interfaces/ports 410/415 for storing software programs and data structures associated with the embodiments described herein. The processor(s) 220 may comprise necessary elements or logic adapted to execute the software programs and manipulate the data structures 446. An operating system 442 (e.g., the Nexus® Operating System, or NX-OS, of Cisco Systems, Inc., as well as the Internetworking Operating System, or IOS®, also of Cisco Systems, Inc.), portions of which are typically resident in memory 440 and executed by the processor(s), functionally organizes the node by, inter alia, invoking network operations in support of software processes and/or services executing on the FPP. It will be apparent to those skilled in the art that other types of processors and memory, including various computer-readable media, may be used to store and execute program instructions pertaining to the techniques described herein.

Portions of the FPP 400 may also be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art. For example, certain processes and/or services as used herein may comprise an illustrative "FPP" process 444, which may contain computer executable instructions executed by the processor(s) 420 to perform various functions relating to the FPP techniques as described herein. In particular, FPP process 444 acts as the data plane of the FCF in a manner as described below in conjunction with the F-CMP 300. Notably, an FPP may also be based on hardware of an FCF, though programmed to operate as an FPP as described herein, thus delegating its control and management planes to an F-CMP server via a proxy function. Note further that certain FCFs in a network may optionally maintain their full responsibility and may locally implement their control and management planes.

Operationally, the F-CMP server 300 communicates with the one or more separately housed FPPs 400 surrounding the FCoE Ethernet network 110 in order to relay control and management information pertinent to FCoE operation. Specifically, the control and management information directs the data plane functionality of the FPPs for forwarding FCoE traffic between initiators and targets across the Ethernet network accordingly.

The F-CMP server to FPP connection is responsible for the transfer of information between the control/management planes to the data plane. Illustratively, this communication may comprise transmission of FCoE Initialization Protocol (FIP) messages. FIP is a known control and management protocol for FCoE that provides for discovery of devices, distribution of device capabilities, sharing of network statistics, exchange of keepalive messages, and establishment and maintenance of relationships (e.g., how devices become aware one another), etc. Further, e.g., through FIP, VLAN discovery may allow FPPs to discover any FCoE VLANs, as may be appreciated by those skilled in the art.

Moreover, according to one or more embodiments herein, the communication between F-CMP server and the FPPs delegates the F-CMP server's data plane responsibilities to the FPPs. In other words, the F-CMP informs the FPPs to use a direct, end-to-end FCoE connection between FPPs across the Ethernet network 110, and to not forward the FCoE traffic to the F-CMP as would conventionally have been the case (cones). The FPPs 400, therefore, are responsible for data plane functionality for forwarding end-to-end FCoE messages, as directed by the F-CMP server 300. Specifically, the roles of the FPP are to support FCoE and Fibre Channel ports and to process FCoE traffic to enforce FCoE access control lists (ACLs) and zoning requirements, which provide a basic provisioning function used to give host devices (e.g., initiators) access to storage (e.g., targets). In this manner, a "distributed" zoning approach is provided through the plurality of FPPs at the edge of the Ethernet network. Note that a single Fibre Channel domain identifier (ID) may also be shared by FPPs connected to the same Ethernet cloud 110, as described further below.

In addition to being responsible for end-to-end FCoE data plane functionality, the FPPs also may proxy control and management protocols between the F-CMP server and one or more FCoE end-point devices (e.g., initiators and/or targets) for which each FPP is correspondingly responsible (i.e., devices that are interconnected with the Ethernet network 110 via the respective responsible FPP). Thus, the control and management protocols, which were conventionally communicated between the FCoE devices 130/135 and the FCF 200, are now communicated, i.e., proxied, between the devices and the F-CMP 300 through FPPs 400. For instance, the proxied control and management protocols may comprise communication of FIP information, keepalive messages, and/or VLAN discovery messages between the F-CMP server 300 and the one or more FCoE end-point devices 130/135 for which the FPP 400 is responsible. In other words, to the FCoE devices 130/135, the FPPs 400, Ethernet network 110, and F-CMP server "appear" as an FCF, thus the control and management traffic "to" the FCF from the FCoE end-point devices are destined to the FPPs. The FPPs then forward the control and management traffic to the control and management planes of the F-CMP servers, accordingly. (Note that ENodes should be informed through FIP of the appropriate destination MAC address to use at fabric login ("FLOGI") time, and virtual link maintenance should be extended to include "end-to-end virtual links."). In an alternative embodiment, FPPs may also terminate and locally process most FIP protocol messages, rather than transmitting them between the F-CMP and end devices (thus, "proxying" may imply processing the messages, rather than or in addition to transmitting them).

In response to the control and management information and protocols being sufficiently processed, the FPPs 300 may process traffic received at their FCoE ports 415 (or Fibre Channel ports 410) according to the directed data plane functionality. In particular, as described herein, FCoE traffic (messages 140) transmitted between first and second FCoE endpoint devices separated by the Ethernet network 110 is directed over the Ethernet network as FCoE traffic (messages 145) between correspondingly responsible FPPs without traversing the F-CMP server 300. Similar to how a conventional FCF 200 would forward traffic to the corresponding FCoE destination device for FCoE, the FPPs receive the traffic, determine the appropriate destination device, along with its correspondingly responsible FPP, and forward the traffic accordingly. The directed data plane functionality may illustratively comprise FCoE ACLs, distributed zoning rules, and/or MAC address mappings for the FPPs (i.e., to which FPP a destination FCoE device "belongs"). As such, the FPPs may enforce the ACLs or zoning, and forward FCoE traffic on the Ethernet network based on the MAC addresses of the FPPs according to the directed data plane functionality from the F-CMP 300.

Figure 5:
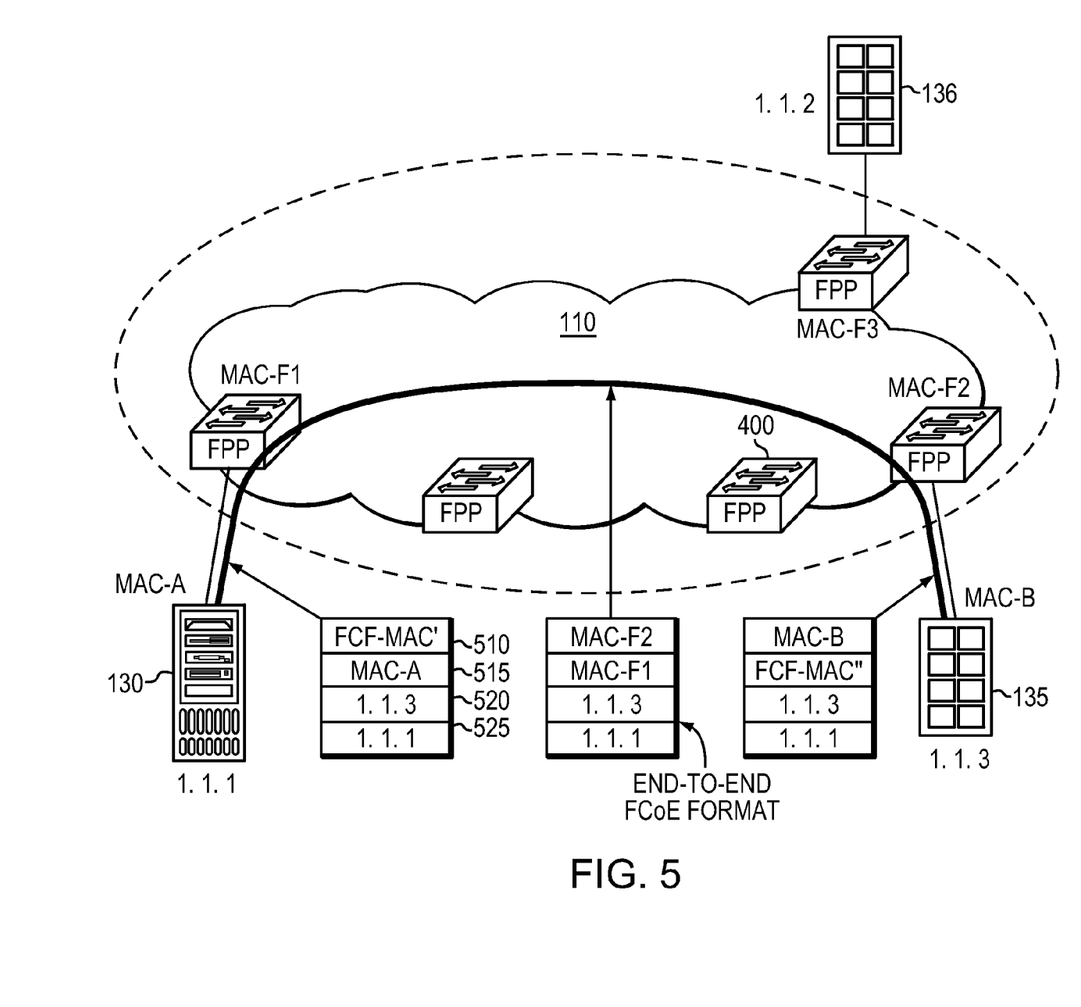
FIG. 5 illustrates an example of end-to-end FCoE.

FIG. 5 illustrates an example of end-to-end FCoE traffic forwarding according to one or more embodiments of the disclosure. For instance, assume that a FCoE initiator 130, having a Fibre Channel address (N_Port_ID) of 1.1.1 and a MAC address of "MAC-A" wishes to communicate with a FCoE target 135, having a Fibre Channel N_Port_ID of 1.1.3 and a MAC address of "MAC-B." The initiator, configured for FCoE, generates an FCoE message according to conventional standards, namely, having the following headers:

Ethernet Destination MAC Address 510=FCF-MAC' (a MAC address of the FCF 200, unknowingly divided into the FPP and F-CMP server);
Ethernet Source MAC Address 515=MAC-A;
Fibre Channel Target Address 520=1.1.3; and
Fibre Channel Initiator Address 525=1.1.1.

The responsible FPP MAC-F1 receives the FCoE traffic, and processes it for end-to-end FCoE by converting the destination MAC address 510 from FCF-MAC' to the appropriate (and direct) FPP's MAC address, that is, MAC-F2, based on the MAC mappings received from the F-CMP 300. The FPP MAC-F1 also converts the source MAC address 515 to its address, MAC-F1, and transmits the traffic over the Ethernet network 110 to be forwarded by switches 115 based on the MAC addresses. Upon receiving the end-to-end FCoE traffic at the destination FPP, the Ethernet headers are processed to their expected format for FCoE enabled target MAC-B, e.g., with the destination MAC address of MAC-B for the target device, and the source MAC address is of FCF-MAC" to mimic the existence of an actual FCF 200. The two FCF-MAC addresses, FCF-MAC' and FCF-MAC", are usually different, however they can also be equal in specific embodiments.

Figure 6:
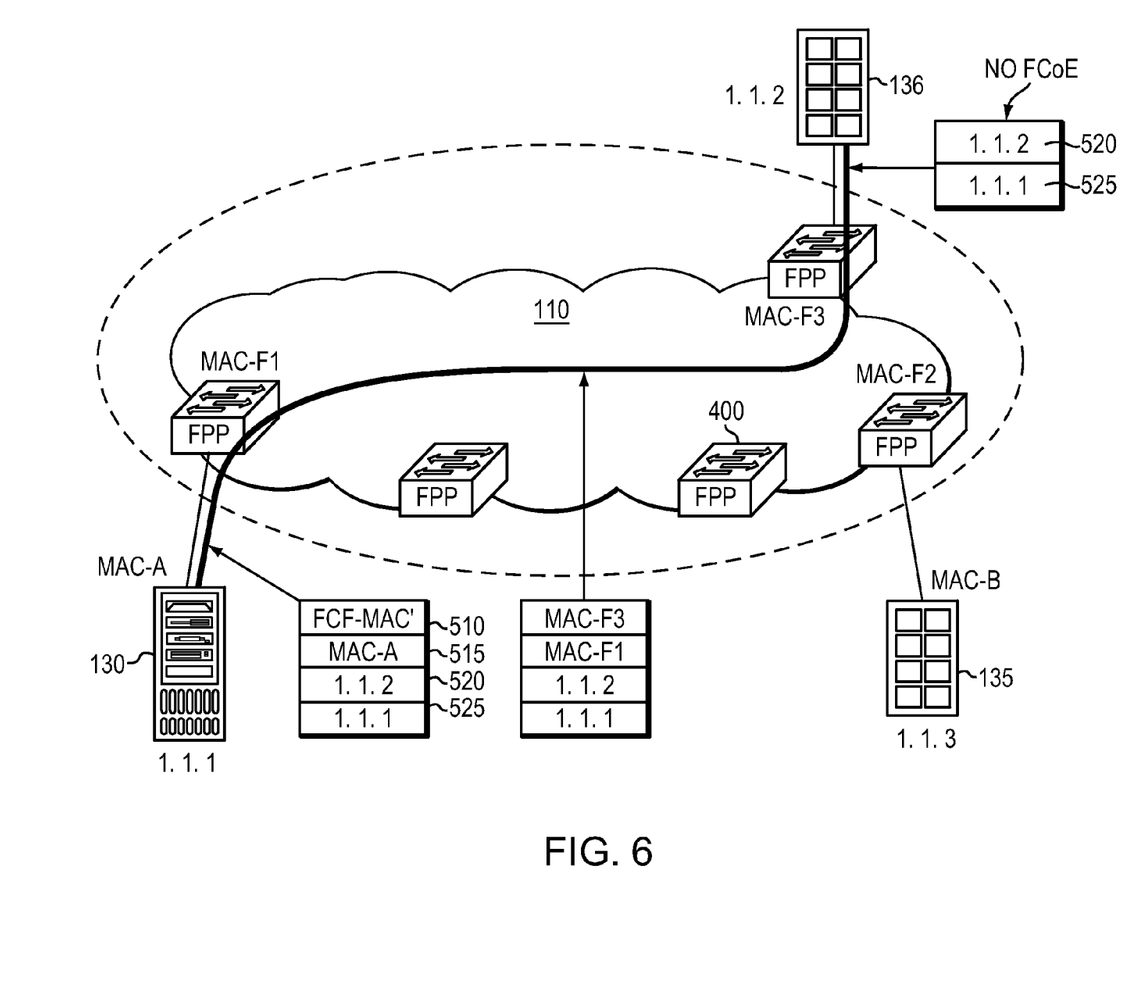
FIG. 6 illustrates another example of end-to-end FCoE.

FIG. 6 illustrates a second example, where the target device is a native Fibre Channel device, not configured for FCoE. In this example, the initiator 1.1.1 (MAC-A) desires to transmit a Fibre Channel message to a target, e.g., a storage array, having a Fibre Channel address of 1.1.2. Accordingly, the initiator 1.1.1 generates and transmits an FCoE message as described above, now with the Fibre Channel target address 520 as 1.1.2. The responsible FPP MAC-F1 receives the message, and again converts it to end-to-end FCoE by inserting Ethernet destination MAC address 510 of the appropriately responsible FPP, MAC-F3. Upon receiving the message at the MAC-F3 FPP, it may be determined that the target device is not capable of understanding FCoE messages having Ethernet headers, such as based on capability exchanges or other control/management determinations proxied by the FPP. As such, FPP MAC-F3 may strip the Ethernet headers from the message, and transmit the message as a native Fibre Channel message having only Fibre Channel headers. In the reverse direction, FPP MAC-F3 would append the Ethernet headers necessary to traverse the Ethernet network toward the MAC-F1 FPP.

Notably, bridges external to FPPs may still implement FCoE cones, thus forwarding all frames to the responsible perimeter FPPs without switching the frames locally. Specifically, where an FPP is responsible for a plurality of FCoE devices interconnected by switches, those switches may still be required to send the FCoE traffic to the FPP for proper data plane treatment as a conventional FCoE cone. In other words, all FCoE traffic must traverse at least one FPP 400, but need not traverse the F-CMP 300.

The interconnection between each FPP and the F-CMP server may be a point-to-point connection, illustratively having an established "trust relationship" for security purposes. For instance, to ensure a trusted relationship, various security measures may be implemented, such as MAC security ("MACsec") standards (e.g., to sign messages). Also, due to the centralized nature of the F-CMP server 300, it may be particularly beneficial to provide a high availability architecture for the F-CMP servers. For example, the FPPs may maintain a redundancy relationship with a plurality of F-CMP servers (which may maintain a redundancy relationship with each other). In the event a primary F-CMP server (e.g., 300*a*) fails or is otherwise non-responsive, then a secondary F-CMP server (e.g., 300*b*) may assume responsibility for the control and management plane functionalities for the FPPs data plane forwarding of end-to-end FCoE traffic. F-CMP servers 300*a* and 300*b* (or more) may be arranged as multiple servers in a localized server cluster, or may be distributed across the network 100.

Additionally, in accordance with one or more embodiments herein, the F-CMP server and FPPs may be configured to support a protocol that collects statistics and monitors traffic. For example, traffic count (number of messages, frequency of messages), traffic monitoring (direction/destination of traffic), and other attributes may be monitored by the FPPs, and transmitted to the F-CMP server for centralized processing and/or reporting.

Figure 7:
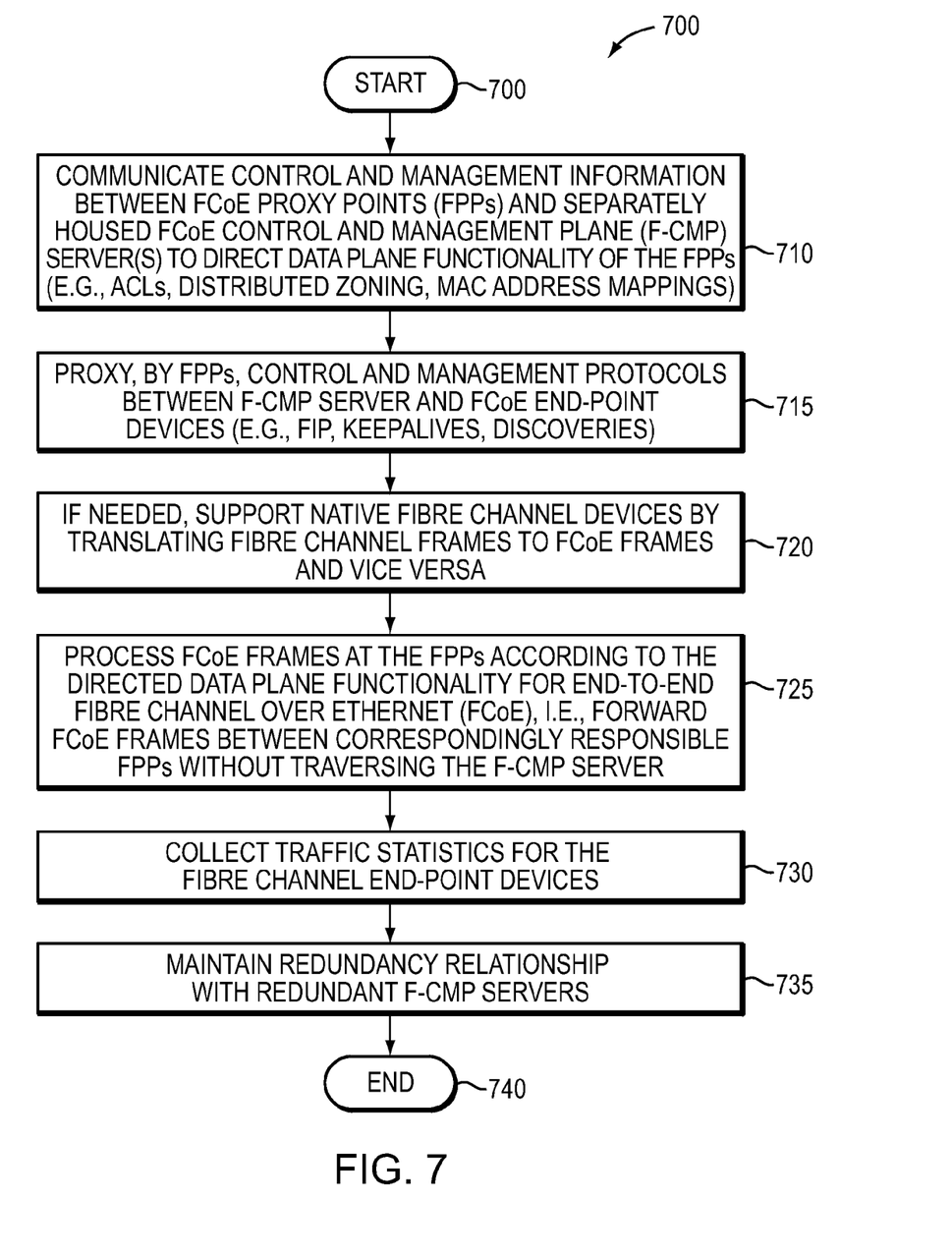
FIG. 7 illustrates an example procedure for end-to-end FCoE.

FIG. 7 illustrates an example simplified procedure for providing for end-to-end FCoE in accordance with one or more embodiments described herein. The procedure 700 starts at step 705, and continues to step 710, where control and management information is communicated between FPPs 400 and separately housed F-CMP servers 300 to direct data plane functionality of the FPPs, such as, e.g., ACLs, distributed zoning, MAC address mappings, etc., as mentioned above. In addition, the FPPs may proxy control and management protocols, such as FIP, keepalives, discoveries, etc., between F-CMP server and FCoE end-point devices 130/135 in step 715 as also mentioned above.

In step 720, when native Fibre Channel devices are connected to an FPP, the FPP processing comprises the encapsulation of received Fibre Channel frames into FCoE frames to be transmitted and the decapsulation of received FCoE frames into Fibre Channel frames. In step 725, FPPs may process FCoE frames (as received or as translated in step 720) according to the directed data plane functionality for end-to-end FCoE. In particular, step 725 implies receiving FCoE traffic at an FPP 400 from locally interconnected FCoE devices 130/135, and transmitting the FCoE traffic to a correspondingly responsible FPP across the Ethernet network 110 without traversing the F-CMP server 300. In addition, step 725 further implies receiving FCoE traffic at an FPP 400 from the network 110, processing it and transmitting it to an appropriate locally interconnected FCoE device, as described in detail above.

Further to the FCoE processing at the FPP, in step 730 the FPPs may also collect traffic statistics for the FCoE end-point devices, and may supply the statistics to the F-CMP servers, as noted above. Also, in step 735, a redundancy relationship may be maintained for redundant F-CMP servers, such as between FPP and F-CMP servers and between F-CMP servers themselves. The procedure 700 ends in step 740. Notably, while the procedure 700 has been shown as a sequence of steps, it should be understood that the steps may be performed in any order, with certain steps being performed substantially simultaneously. For instance, communicating and/or proxying control and management information and protocols may be an ongoing process while processing received traffic and monitoring the traffic. Therefore, the steps shown in FIG. 7 are merely representative, and are not meant to limit the scope of the present disclosure.

The novel techniques described herein thus provide for end-to-end FCoE in a computer network. By decoupling the data plane from the Fibre Channel services (FPPs from F-CMP servers), the novel techniques provide a data plane for FCoE that is Ethernet edge-to-edge and maintains the control and management plane of Fibre Channel fabric operation primarily unchanged. In particular, the techniques described above are scalable through delegating to the periphery of the Ethernet cloud the FIP, keepalives, and zoning, which itself notably involves fewer F-CMP servers in the embodiments above than FCoE switches or FCFs in previous architectures.

In addition, the techniques scale by allowing the use of one or more domain IDs per Ethernet cloud, which can each connect 64K ENodes. For instance, as mentioned above, a single Fibre Channel domain ID may be shared among a plurality of FPPs, e.g., all of the FPPs, connected to the same F-CMP server (e.g., the entire Ethernet cloud 110), which is one reason for the improved scalability. For example, suppose an illustrative data center has 10,000 servers organized in 1,000 racks of 10 servers, and that the racks are further organized in 20 rows of 50 racks. Without utilizing the techniques described herein, each ToR (Top of the Rack) switch needs its own Domain ID and each EoR (End of Row) also needs its own Domain ID. In total, this results in this example in 1,020 Domain IDs, much more than Fibre Channel protocols currently support (e.g., supporting a maximum of 239 Domain IDs). According to the techniques herein, however, the ToR switches may be configured as FPPs, thus not requiring their own Domain ID since they can share the Domain ID with a corresponding EoR F-CMP server. With this shared Domain ID arrangement, there would only be 20 Domain IDs required in the example, each ID corresponding to one F-CMP server and its 50 attached FPPs for which it is responsible. Note that this technique of sharing a Domain ID between an F-CMP server and FPPs may also be used in a classical FC environment, such as where all ports of an FPP or other FC device are FC ports and not FCoE ports.

While there have been shown and described illustrative embodiments that provide for end-to-end FCoE, it is to be understood that various other adaptations and modifications may be made within the spirit and scope of the embodiments herein. For instance, the F-CMP servers have been shown comprising only control plane and management plane functionality. However, the embodiments herein are not so limited, and the F-CMP servers may also comprise Fibre Channel data plane functionality. For example, a centralized F-CMP server (or set of redundant F-CMP servers) may be configured to act as the control plane and management plane of a plurality of other FPPs in the Ethernet network 110, while at the same time offering data plane functionality to one or more FCoE devices for which the F-CMP server is responsible on FCoE ports of the F-CMP server. Said differently, an F-CMP server may also operate as its own local FPP for local FCoE devices, while at the same time the F-CMP server still functions to communicate control and management information to other separately housed FPPs for remote FCoE devices in the Ethernet network.

Also, while the term FCoE proxy point (FPP) is used, alternative labels may be provided for a functionally similar device, such as, e.g., a small FCF (sFCF), a FC/FCoE data-plane forwarder (FDF), etc.

The foregoing description has been directed to specific embodiments, it will be apparent that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. For example, the techniques described herein may illustratively be performed by hardware, software, and/or firmware, such as in accordance with an example F-CMP process 344 or FPP process 444, which may contain computer executable instructions executed by processors 320/420 to perform functions relating to the novel techniques described herein. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   coupling a Fibre Channel over Ethernet (FCoE) proxy point (FPP) that is connected to one or more endpoint devices with one or more other FPPs and a FCoE control and management plane (F-CMP) server, the FPP providing data plane functionality and the F-CMP server providing control plane functionality;
   proxying control and management traffic received at the FPP between the F-CMP server and the one or more end point devices connected to the FPP, wherein the control traffic dictates forwarding rules; and
   transmitting FCoE traffic received at the FPP from the one or more end point devices connected to the FPP to the one or more other FPPs without the FCoE traffic traversing the F-CMP server, the transmitting performed by data plane functionality of the FPP operating under directions from the control plane functionality of the F-CMP server.

2. The method of claim 1, wherein the FPP and the one or more other FPPs are coupled by one or more switches of an Ethernet network.

3. The method of claim 1, wherein the proxying comprises: communicating FCoE Initialization Protocol (PIP) information between the F-CMP server and the one or more end point devices connected to the FPP.

4. The method of claim 1, wherein the proxying comprises: communicating keep alive messages between the F-CMP server and the one or more end point devices connected to the FPP.

5. The method of claim 1, wherein the proxying comprises: communicating virtual local area network (VLAN) messages between the F-CMP server and the one or more end point devices connected to the FPP.

6. The method of claim 1, wherein the transmitting enforces FCoE access control lists under directions from the control plane functionality of the F-CMP.

7. The method of claim 1, wherein the transmitting enforces distributed zoning under directions from the control plane functionality of the F-CMP.

8. The method of claim 1, wherein the transmitting forwards FCoE traffic based on media access control (MAC) addresses of the FPP and the one or more other FPPs under directions from the control plane functionality of the F-CMP.

9. The method of claim 1, further comprising: translating between native Fibre Channel traffic and FCoE traffic at the FPP.

10. The method of claim 1, wherein the coupling further comprises: coupling the FPP to one or more other F-CMP servers, the F-CMP server and the one or more other F-CMP servers maintained in a redundancy relationship.

11. An apparatus, comprising:
    one or more Fibre Channel network interfaces configured to communicate with endpoint devices; one or more Ethernet interfaces configured to communicate over an Ethernet network; a processor coupled to the one or more Fibre Channel network interfaces and the one or more Ethernet interfaces, and configured to execute one or more software processes; and a memory configured to store a Fibre Channel over Ethernet (FCoE) proxy point (FPP) process executable by the processor, the FPP process when executed operable to: proxy control management traffic received at the apparatus between an FCoE control and management plane (F-CMP) server in the Ethernet network and the one or more end point devices, wherein the at least some control traffic dictates forwarding rules, and transmit FCoE traffic received at the FPP from the one or more end point devices to one or more other FPPs without the FCoE traffic traversing the F-CMP server under directions from control plane functionality of the F-CMP server.

12. The apparatus of claim 11, wherein the FPP process when executed is further operable to: communicate FCoE Initialization Protocol (PIP) information between the F-CMP server and the one or more end point devices.

13. The apparatus of claim 11, wherein the FPP process when executed is further operable to: communicate keep alive messages between the F-CMP server and the one or more end point devices.

14. The apparatus of claim 11, wherein the FPP process when executed is further operable to: communicate virtual local area network (VLAN) messages between the F-CMP server and the one or more end point devices.

15. The apparatus of claim 11, wherein the FPP process when executed is further operable to: enforce FCoE access control lists under directions from the control plane functionality of the F-CMP.

16. The apparatus of claim 11, wherein the FPP process when executed is further operable to: enforce distributed zoning under directions from the control plane functionality of the F-CMP.

17. The apparatus of claim 11, wherein the FPP process when executed is further operable to: forward FCoE traffic based on media access control (MAC) addresses of the FPP and the one or more other FPPs under directions from the control plane functionality of the F-CMP.

18. The apparatus of claim 11, wherein the FPP process when executed is further operable to: translate between native Fibre Channel traffic and FCoE traffic.

19. The apparatus of claim 11, wherein the F-CMP server and the one or more other F-CMP servers are maintained in a redundancy relationship.

20. A non-transitory computer-readable storage device storing instructions which, when executed by a processor, cause the processor to perform operations comprising: proxying at least some control and management traffic received at a Fibre Channel over Ethernet (FCoE) proxy point (FPP) between a FCoE control and management plane (F-CMP) server that provides control plane functionality and the one or more end point devices connected to the FPP, wherein the at least some control traffic dictates forwarding rules; and transmitting FCoE traffic received at the FPP from the one or more end point devices connected to the FPP to the one or more other FPPs without the FCoE traffic traversing the F-CMP server under directions from the control plane functionality of the F-CMP server.

* * * * *